United States Patent Office 3,471,081
Patented Oct. 7, 1969

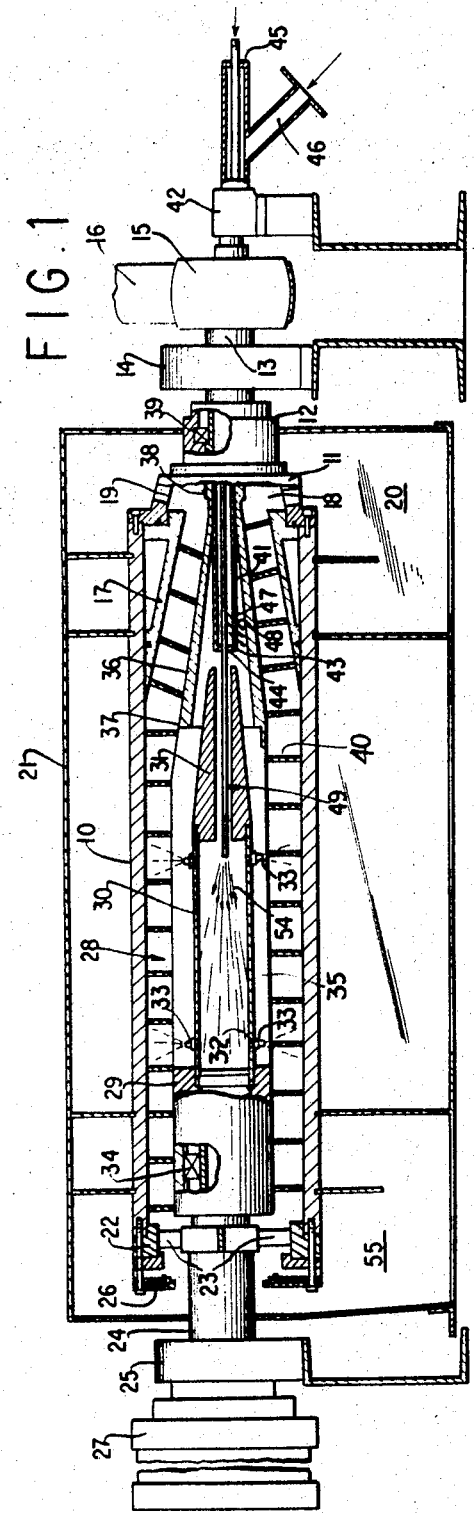
Oct. 7, 1969  F. O'CONOR  3,471,081
ACID FEED PIPE
Filed Dec. 21, 1967
INVENTOR
FRANK O'CONOR
BY
Smythe & Moore
ATTORNEYS

3,471,081
ACID FEED PIPE
Frank O'Conor, Moline, Ill., assignor to Ametek, Inc., New York, N.Y., a corporation of Delaware
Filed Dec. 21, 1967, Ser. No. 692,553
Int. Cl. B04b 15/12, 11/02
U.S. Cl. 233—14                                              4 Claims

ABSTRACT OF THE DISCLOSURE

A horizontal type centrifugal separator having a separator-conveyor assembly rotatably mounted therein and a tubular member within the assembly. A feed tube extends axially into the separator-conveyor assembly and supports the inner portion of a wash pipe which extends in the manner of a cantilever beam into the tubular member. The wash pipe is tapered toward its outer end portion.

---

The present invention relates to an acid wash pipe in a horizontal type centrifugal separator, more particularly, to the structure of the wash pipe and the arrangement for supporting the wash pipe within the separator in the manner of a cantilever beam.

One form of apparatus commonly used for the separation of solids from a solids-liquid slurry is a horizontal type centrifugal separator. Such a separator may be of the so-called solid bowl type in which slurry is continuously fed into the rotating bowl and the clarified liquor or effluent is continuously withdrawn from one end of the separator. The separated solids are discharged from the other end of the separator into a suitable bin. With many slurries, difficulty may be experienced in obtaining a satisfactory centrifugal separation of solids from liquids, particularly, very fine particles dispersed or in colloidal suspension in the liquid phase of the slurry. Various types of chemicals such as acids have been employed which will aid the separation of such solids. Such chemicals which act in various ways to promote removal of the particles may be generally referred to as flocculents. While such flocculents are commonly used under normal gravitational settling conditions, difficulties have been experienced in introducing such flocculents to the slurry in a horizontal type centrifugal separator. The various structures devised to date for adding the chemicals into the slurry during operation of the separator have been unsatisfactory.

It is therefore an object of the present invention to provide a novel and improved arrangement for introducing the washing liquid into the rotating separator-conveyor assembly of a horizontal type centrifugal separator.

It is another object of the present invention to provide a novel and improved wash feed pipe for a horizontal type centrifugal separator.

It is a further object of the present invention to provide a simple but effective structure which occupies a minimum of space for supporting a wash feed pipe within a horizontal type centrifugal separator.

In one aspect of the present invention there may be provided a horizontal type centrifugal separator having a drum rotatably mounted therein about a horizontal axis. Within the drum there is mounted a separator-conveyor assembly having a cylindrical portion with a tubular element of smaller diameter extending axially therefrom. There is a conical portion at the other end of the tubular element and there are apertures in the tubular element. A conical member is provided at the other end of the separator-conveyor assembly and extends over the tubular element conical end. The portion of the tubular element between the cylindrical portion and the conical member is provided with longitudinally extending radial vanes. Spiral vanes are mounted about the cylindrical portion, the radial vanes and the conical member to form a screw conveyor. The drum and the separator-conveyor are rotated at different speeds. A slurry feed tube extends axially into the conical member and has openings therein through which a slurry may be fed to the separator-conveyor assembly between the conical member and the tubular element conical end section. A wash pipe is mounted within the feed tube and extends axially into the tubular member to introduce a washing liquid therein. The wash pipe is supported within the end of the feed tube so that its outer ends extends in the manner of a cantilever beam into the tubular member. The wash pipe is tapered toward its outer end.

Other objects and advantages of the present invention will be apparent upon reference to the accompanying description when taken in conjunction with the following drawings, which are exemplary, wherein;

FIG. 1 is a longitudinal sectional view taken in the vertical plane of a horizontal type centrifugal separator in which the wash feed pipe of the present invention is incorporated;

FIG. 2 is a longitudinal sectional view but in enlarged scale of the wash feed pipe and slurry feed tube assembly;

FIG. 3 is a sectional view taken along the line 3—3 of FIG. 2 to illustrate the cross-section of the wash feed pipe; and FIG. 4 is a sectional view taken along the line 4—4 of FIG. 2 and showing the cross-section of the outer portion of the wash feed pipe.

Proceeding next to the drawings wherein like reference symbols indicate the same parts throughout the various views a specific embodiment of the present invention will be described in detail.

As may be seen in FIG. 1 the centrifugal separator comprises a relatively long hollow drum 10 mounted for rotation about a horizontal axis. The drum 10 has a dry end plate 11 mounted on one end thereof with a housing portion 12 and a shaft 13 extending therefrom and journaled in a bearing assembly 14. A driving pulley 15 is secured on the end of the shaft 13 and is drivingly connected by a belt 16 to a source of power for rotating the drum.

A truncated conical insert 17 is mounted within the drum and one end thereof forms with a portion of dry plate 11 a collecting chamber 18 for receiving the separated solids. The dry plate is provided with a plurality of radial solid discharge ports 19 which communicate with a chamber 20 within a housing 21 surrounding the drum.

The opposite end of the drum 10 is provided with a wet end plate 22 having effluent discharge ports 23 therein and a hollow shaft 24 extending axially therefrom. The shaft 24 is journaled in and extends beyond a bearing assembly 25 which is similar to the bearing assembly 14. A plurality of dam rings 26 of varying inner diameters are mounted on the wet end plate 22 by bolts. A gear reducing unit 27 having a plurality of planetary gears stages may be mounted at the extended end of the shaft 24.

Within the drum 10 there is mounted a separator-conveyor assembly indicated generally at 28 and comprising a cylindrical portion 29 and a tubular element 30 extending axially therefrom with a tapered or conical end portion 31. The tubular element is provided with openings 32 in which may be mounted nozzles or jets 33. The cylindrical portion is provided with antifriction bearings 34 so as to be journaled on the inner end of shaft 24.

A plurality of longitudinally extending radial vanes 35 may be equally spaced about and fastened to the outer periphery of tubular element 30. A hollow conical member 36 has its base portion 37 suitably fastened to the longitudinal vanes 35 and includes a hollow shaft extension 38 which is journaled in an antifraction bearing 39 located in housing portion 12 of the dry end plate 11. A spiral vane 40 surrounds the outer faces of the cylindrical portion 29, the radial vanes 35 and the conical member 36. The spiral vane forms a screw conveyor with the spiraling being such that the solids separated from the slurry are moved toward dry end plate 11 and the discharge ports 19.

A stationary slurry feed tube has its outer end supported by a fixture 42 and extends axially into the conical member 36. The innner end of the feed tube is closed at 43 and is provided with an aperture 44. The other end of the slurry feed tube is similarly closed at 45 and spaced therefrom is an inlet 46 through which the clurry is introduced. The feed tube is non-rotatably mounted with respect to the centrifugal separator and its longitudinal axis may be coaxial with the rotational axis of the drum and separator-conveyor assembly. The wall of the feed discharge tube at its inner end is provided with the opening 47 through which the slurry is discharged as shown by the arrows 48 into the space between the conical member 36 and the conical end portion 31.

A wash feed pipe 49 for introducing various types of washing liquids into the rotating separator-conveyor assembly is coaxially and non-rotatably mounted within the slurry feed tube 41. As may be more clearly seen in FIG. 2, the wash feed tube 49 comprises an inner portion 50 which is supported in its entirety within the slurry feed tube 41 and an outer portion 51 which extends outwardly from the end of the slurry feed tube. The outer portion 51 of the wash feed pipe is of a smaller diameter and has a smaller cross-sectional area than the inner portion 50 so as to constitute, in effect, a tapering pipe. The outer wash feed pipe portion extends in the manner of a cantilever beam from a mounting 52 which secures one end of the inner portion 50 within the slurry feed tube. The wash pipe extends through a suitable seal 53 into the conical end portion 31 to discharge a washing liquid within the tubular member as indicated by the arrows 54.

In order to minimize the effects of vibration on the wash pipe, the cross-section of the wash pipe tapers towards its outer end as described above. In this manner there is provided a natural frequency of the wash pipe assembly which is greater than the operating speed of the machine. It is apparent that if the natural frequency or resonant point of the wash pipe assembly is within the operating speed of the separator, the pipe assembly would vibrate violently at that point and contact rotating parts. The wash feed pipe is therefore constructed with a tapered section to reduce its weight while at the same time providing the larger diameters at the clamping area 52 so as to provide the largest possible moment of inertia.

In the operation of the centrifugal separator as disclosed herein the drum and conveyor assembly will rotate in the same direction but at different speeds. The slurry will be introduced through the feed tube 41 and discharged through opening 47 into the conical member 36. The vanes 35 will cause centrifugal separation of the solids from the slurry with the solids moving radially outwardly toward the outer periphery of the drum and the liquid remaining radially inwardly thereof. The spiral vane of the conveyor will then move the solids toward the solids collecting chamber 18 from which the solids are discharged through ports 19 into the chamber 20. The liquid will move toward the wet end plate 22 and would be discharged through ports 23 into a chamber 55.

In order to produce a floccing action on the slurry being separated, a washing liquid in the form of an acid is introduced through wash feed pipe 49. The action will be discharged through nozzles in the wall of the tubular member and will mix with the material being processed in that area. The acid will act on the slurry material to bring about a floccing action which facilitates and enhances the separation of solids from the liquids within the machine. With this arrangement a satisfactory floccing is accomplished in the machine and a considerable amount of time and expense is saved in processing the material after it is discharged from the separator. This material is essentially a waste product and at the present time can only be disposed of by dumping it in ponds and chemically treating the material to bring about flocculation. A gravity separation will then finally take place. However, as described above, the flocculation will occur within the machine and, as a result, a substantially clear effluent will be discharged into the chamber 55 and this clear effluent can then be dumped into a near-by stream without the necessity for further chemical treatment.

Thus it can be seen that the present invention provides an improved wash feed pipe for introducing acids or other washing liquids into the interior of the separator-conveyor assembly of a horizontal centrifugal separator. The wash feed pipe is positioned in the manner of a cantilever beam and has a tapering cross-section so as to eliminate problems resulting from the vibration of the rotating parts. By constructing and mounting the wash pipe in this manner, the pipe will be free from vibrations during the operation of the separator and, accordingly, will not come into contact with any of the rotating elements thereof.

It is to be understood that various details of construction and arrangement of parts may be made within this invention without departing from the spirit of the invention except as defined in the appended claims.

What is claimed is:

1. In a horizontal type centrifugal separator, a drum rotatably mounted about a horizontal axis, a separator-conveyor assembly having a cylindrical portion with a tubular element of smaller diameter extending axially therefrom with there being a conical portion at the other end of said tubular element and apertures in said tubular element, a conical member at the other end of said separator-conveyor assembly and extending over said tubular element conical end, radial vane means extending longitudinally on said tubular element between said cylindrical portion and said conical member, spiral vane means around said cylindrical portion, said radial vane means and said conical member to form a screw conveyor, means for rotating said drum and separator-conveyor assembly at different speeds, a slurry feed tube extending axially into said conical member and having openings therein through which slurry is fed to said separator-conveyor assembly, and a wash pipe mounted within said feed tube and extending axially into said tubular member to introduce a washing liquid therein.

2. In a horizontal type centrifugal separator as claimed in claim 1 with said wash pipe being supported within the end of said feed pipe and having its outer end extending cantileverly into said tubular member.

3. In a horizontal type centrifugal separator as claimed in claim 2 with said wash pipe being tapered toward its outer end.

4. In a horizontal type centrifugal separator as claimed in claim 2 with the cross-section of said wash pipe outwardly of said feed tube being less than its cross-section within the feed tube.

References Cited

UNITED STATES PATENTS 2,685,369  8/1954  Crossley _____ 233—7 X
3,326,457  6/1967  McMorris _____ 233—7

ROBERT W. JENKINS, Primary Examiner

U.S. Cl. X.R.

233—7